US010543944B2

(12) United States Patent
Batema

(10) Patent No.: US 10,543,944 B2
(45) Date of Patent: Jan. 28, 2020

(54) METHODS FOR ASEPTIC PACKAGING OF LOW-ACID FOODS

(71) Applicant: Mead Johnson Nutrition Company, Glenview, IL (US)

(72) Inventor: Rosanne P. Batema, Evansville, IN (US)

(73) Assignee: MEAD JOHNSON NUTRITION COMPANY, Evansville, IN (US)

( * ) Notice: Subject to any disclaimer, the term of this patent is extended or adjusted under 35 U.S.C. 154(b) by 663 days.

(21) Appl. No.: 14/190,735

(22) Filed: Feb. 26, 2014

(65) Prior Publication Data

US 2015/0239594 A1 Aug. 27, 2015

(51) Int. Cl.
*B65B 55/10* (2006.01)
*B65B 3/02* (2006.01)

(52) U.S. Cl.
CPC .............. *B65B 55/10* (2013.01); *B65B 3/022* (2013.01)

(58) Field of Classification Search
CPC ... B29B 49/04; B29B 49/044; B29B 49/4635; B29B 49/4679; B65B 55/10; B65B 3/022
USPC .......................................................... 53/426
See application file for complete search history.

(56) References Cited

U.S. PATENT DOCUMENTS

| | | | |
|---|---|---|---|
| 4,208,852 A * | 6/1980 | Pioch ...................... | B29C 49/46 141/243 |
| 4,417,607 A * | 11/1983 | Scholle ................. | B65B 55/022 134/134 |
| 4,623,516 A | 11/1986 | Weiler et al. | |
| 5,759,218 A * | 6/1998 | Martin .................... | B29C 49/46 264/525 |
| 6,098,676 A | 8/2000 | Poynter et al. | |
| 6,214,282 B1 | 4/2001 | Katou et al. | |
| 2004/0065983 A1 | 4/2004 | Hansen et al. | |
| 2006/0249887 A1 * | 11/2006 | Maddox .................. | B29C 49/42 264/524 |
| 2013/0061557 A1 * | 3/2013 | Kitano .................. | B67C 7/0073 53/167 |

FOREIGN PATENT DOCUMENTS

JP         S6049919        3/1985
WO         199726126       7/1997

OTHER PUBLICATIONS

Weiler Innovations Brochure, Safeguarding Solutions Through Innovative Packaging, 2007.
Zimmerman, L., "Technical Measures for Aseptic Packaging of Liquids with the 'bottlepack-aseptic-system'," Editio Cantor, vol. XXVII, p. 77-82 (1984).

* cited by examiner

*Primary Examiner* — Chelsea E Stinson
(74) *Attorney, Agent, or Firm* — Troutman Sanders LLP; Ryan Schneider; Chris Davis

(57) ABSTRACT

The present disclosure relates to methods of maintaining sterility of an aseptic work zone of a blow-fill seal operation so that low acid foods may be aseptically processed and packaged. The methods of the present disclosure further provide for maintain the sterility of the aseptic work zone such that the aseptic work zone does not have to be enclosed in a separate sterile environment during the blow fill seal process. The methods of the present disclosure further provide a sterilization procedure that is compliant with FDA regulations related to the aseptic packaging of low acid food products. Further disclosed, are methods for producing a hermetically sealed container containing a low acid food product.

10 Claims, 4 Drawing Sheets

METHODS FOR ASEPTIC PACKAGING OF LOW-ACID FOODS

TECHNICAL FIELD

The present disclosure relates generally to methods for pre-sterilizing, forming and maintaining the sterility of an aseptic work zone of a blow-fill seal operation, such that low acid foods may be aseptically packaged. Further provided are methods for pre-sterilizing, forming and maintaining the sterility of an aseptic work zone of a blow-fill seal operation in compliance with United States Food and Drug Administration regulations.

BACKGROUND ART

A variety of techniques have been developed for processing, packaging, and storing food products. Among these techniques are freezing, canning, irradiation, and drying. More recently, food products are being packaged and stored by an aseptic packaging procedure. Aseptic packaging allows food products to be stored at room temperature for extended periods of time without spoiling or degradation of the food product.

Generally, during aseptic processing, the food product is sterilized to destroy any sources of decay such as thermophilic spores or other pathogens. The food product is then placed in sterilized protective packaging. The process and equipment used during aseptic packaging must also remain sterile so as not to contaminate the food product or the packaging material. The packaging material, once sealed around the sterilized food product, provides a barrier against any later possible invasion by harmful organisms or pathogens, and therefore provides a commercially sterile food product. Aseptic packaging provides a packaged food product having a shelf life of 150 days or more.

In the United States, the aseptic processing of food products is regulated by the U.S. Food and Drug Administration ("FDA"). The FDA categorizes food products as either high acid products, having a pH below 4.6, or low acid products, having a pH above 4.6. The acid content of high acid food products helps to reduce the microbial population in the food product and also inhibits the growth of microorganisms. However, low acid food products do not provide this anti-bacterial environment, and accordingly, the FDA regulations for the aseptic processing and packaging of low acid foods are more stringent.

As such, while blow fill seal processes have gained wide acceptance in the pharmaceutical industry and for high acid foods, due to strict sterility requirements, low acid foods are generally not aseptically packaged by blow-fill seal operations.

During the blow fill seal process/operation a container is formed, filled with the desired product, and sealed in a continuous process without human intervention, in an enclosed area or environment inside a machine. Typically, blow-fill seal processes carry out both the forming of the primary package and the subsequent filling operation. The enclosed stationary sterile area where the forming of the package and the filling occurs is often referred to as an aseptic work zone ("AWZ"). Typically, the aseptic work zone is the area(s) of a filling operation where the sterile package and sterile product are combined. Thus in many blow-fill-seal fillers the aseptic work zone can be quite large. Further, in many conventional blow-fill seal processes the aseptic work zone is a stationary area that is sterilized. The blow-fill seal operation maintains an aseptically sterile work zone for the aseptic processing of food products.

Further, in conventional blow-fill seal aseptic operations the aseptic work zone includes product contact surfaces which are pre-sterilized and the filling area, which includes the entire area under a shroud where the filling occurs. In conventional blow-fill seal operations, the area under the shroud is not currently pre-sterilized. However, HEPA-filtered air is used to provide sterile filtered air in the filling zone within the blow-fill seal machine. Pressure differentials are used within the room containing the blow-fill seal machine and between the area where the parison is formed and the filling area. Accordingly, sterility maintenance is achieved through use of sterile-filtered air, HEPA-filtered air, and pressure differentials for the rest of the machine.

The use of blow fill seal technology has come under scrutiny from regulatory authorities, such as the U.S. Food and Drug Administration. There are concerns surrounding the possibility of product contamination by airborne particles, and in particular viable microorganisms, which have led to debate about the quality of the environment where filling and sealing of the blow-fill seal containers and/or packages occurs.

Thus, given these sterility concerns, the need for high volume product output, and low operation costs, there exists a need for improved blow-fill seal processes over conventional blow-fill seal processes. Additionally, the aseptic work zone of conventional blow-fill seal machines do not meet the sterility standards established by the FDA for the packaging of low acid food products.

Accordingly, this disclosure is directed to an aseptic work zone using blow-fill-seal aseptic packaging that satisfies the regulatory requirements for aseptic filling of low-acid foods. Moreover, the disclosure is directed to methods of maintaining sterility of the aseptic work zone, such that low acid foods may be aseptically packaged in accordance with FDA standards. The methods disclosed herein further include an aseptic work zone that is mobile. Additionally, the disclosure is directed to methods of maintaining the sterility of the aseptic work zone during multiple blow-fill seal cycles, such that the blow fill seal operation does not have to take place in an enclosed environment. Further provided herein are methods for forming a hermetically sealed container that includes a sterile low-acid food product.

BRIEF SUMMARY

Briefly, the present disclosure is directed, in an embodiment, to a method(s) of forming and maintaining the sterility of an aseptic work zone, such that the aseptic work zone maintains sterility throughout multiple blow-fill seal cycles. Additionally, the present disclosure is directed to methods of maintaining the sterility of an aseptic work zone such that low-acid foods may be aseptically processed via a blow-fill seal process in accordance with U.S. FDA standards.

It is to be understood that both the foregoing general description and the following detailed description present embodiments of the disclosure and are intended to provide an overview or framework for understanding the nature and character of the disclosure as it is claimed. The description serves to explain the principles and operations of the claimed subject matter. Other and further features and advantages of the present disclosure will be readily apparent to those skilled in the art upon a reading of the following disclosure.

DETAILED DESCRIPTION

Figure 1:
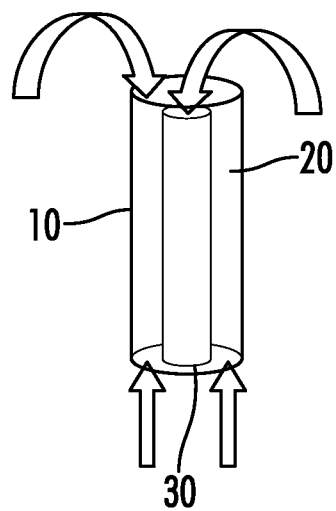
FIG. 1 illustrates an enlarged image of the fill nozzle assembly including the internal fill nozzle sleeve and fill tube.

Reference now will be made in detail to the embodiments of the present disclosure, one or more examples of which are set forth herein below. Each example is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present discussion is a description of exemplary embodiments only and is not intended as limiting the broader aspects of the present disclosure.

"Aseptic processing" or "aseptic packaging" means the filling of a commercially sterilized cooled product into pre-sterilized containers, followed by aseptic hermetical sealing, with a pre-sterilized closure, in an atmosphere free of microorganisms.

"Parison" is an extruded hot, molten, hollow tube of plastic. The parison is formed using an extruder and sterile air and is blown into the parison to maintain its shape prior to the mold closing around it to form a plastic container.

"Ballooning Gas" is sterile filtered gas that is used to maintain the tubular shape of the parison.

"Blowing Gas" is sterile filtered gas that is used to blow or form a plastic container from the parison. The blowing gas is administered once the bottom mold closes around the parison and the mold moves under the fill nozzle assembly and the fill nozzle descends into the mold. In some embodiments, blowing gas is administered by the fill nozzle assembly via the fill nozzle sleeve.

"Blow mold" as used herein, refers to the mold used in the blow-fill seal process to form the plastic container from the parison. The mold may include several different sections. For examples, the "bottom mold" forms the bottom of the final container, while the "seal mold" forms the hermetic seal of the plastic container.

"Clamping jaws" as used herein, hold the hot molten parison open to permit the fill nozzle assembly to enter the aseptic work zone.

"Mold carriage" is a device that holds the mold and moves between the extruder station where the parison is formed and the station where blowing and filling occur.

"Aseptic Work Zone" ("AWZ") is comprised of only the critical, direct, and indirect food product contact surfaces of the fill nozzle assembly, blow-fill parison and resulting hermetically sealed container.

"Fill cycle" as used herein, refers to the total time for the blow-fill-seal operation starting from the time the bottom mold closes on the parison and ending when the empty blow mold moves back to position under the parison extruder. The fill cycle includes, but is not limited to the following steps: bottom of the blow mold closes on the parison, cutting apparatus cuts the parison from the extruder, the mold carriage moves the parison to the filling station, the parison is blown into a container, the container is filled with low acid food product, the container is sealed and removed from the blow mold apparatus, and the empty mold carriage moves the blow mold back to position under the parison extruder.

"Commercial sterility of thermally processed food" means the condition achieved by the application of heat which renders the food substantially free of microorganisms capable of reproducing in the food under normal non-refrigerated conditions of storage and distribution. As used herein commercial sterility also refers to the condition achieved by the application of heat which renders the food substantially free of viable microorganisms, including but not limited to spores, that are of public health significance. This definition also includes the processes of food by the control of water activity and the application of heat, which renders the food free of microorganisms capable of reproducing in the food under normal non-refrigerated conditions of storage and distribution.

"Commercial sterility of equipment and containers" used for aseptic processing and packaging of food means the condition achieved by application of heat, chemical sterilant(s), or other appropriate treatment that renders the equipment and containers substantially free of viable microorganisms having public health significance, as well as microorganisms of non-health significance, capable of reproducing in the food under normal non-refrigerated conditions of storage and distribution.

"Hermetically sealed container" means a container that is designed and intended to be secure against the entry of microorganisms and thereby to maintain the commercial sterility of its contents after processing.

"Low acid food product" means any food, other than alcoholic beverages, with a finished equilibrium pH greater than 4.6 and a water activity ("aw") greater than 0.85. In some embodiments, the low acid food product is infant formula. In other embodiments, the low acid food product is a nutritional composition suitable for use in the neonatal intensive care unit including, but not limited to, protein solutions, human milk fortifier, and/or infant formula.

"United States Food and Drug Administration" or "FDA" refers to the United States agency within the Department of Health and Human Services, which addresses food and feed safety, nutrition, and other public health goals.

"Vapor hydrogen peroxide" as used herein is also known as hydrogen peroxide vapor or by the name VHP™. Vapor hydrogen peroxide is a gaseous form of hydrogen peroxide having the molecular formula $H_2O_2$. VHP™ is registered by the U.S. Environmental Protection Agency, ("EPA") as a sterilant, which is defined as "a substance that destroys or eliminates all forms of microbial life in the inanimate environment, including all forms of vegetative bacteria, bacterial spores, fungi, fungal spores, and viruses".

"Chlorine dioxide" as used herein is a chemical compound with the molecular formula $ClO_2$. It is an oxidizing agent that is commonly used in water treatment and bleaching. Chlorine dioxide may also be used for air disinfection.

"Nitrogen dioxide" as used herein is a chemical compound with the molecular formula $NO_2$.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful for these methods and devices.

As used herein, the term "about" should be construed to refer to both of the numbers specified as the endpoint(s) of any range. Any reference to a range should be considered as providing support for any subset within that range.

Generally, the present disclosure is directed to a method of forming and maintaining an aseptic work zone for a blow-fill seal operation. Further, the present disclosure is directed to a method of continuously producing an aseptic work zone for a blow-fill seal operation. Additionally, the present disclosure is directed to methods of blow-fill seal operations having a continuously renewed aseptic work zone, such that the blow-fill seal operation does not have to take place in an enclosed environment to ensure sterility. The present disclosure also provides methods of packaging low acid foods in accordance with FDA standards via a blow-fill seal operation.

Moreover, the disclosure is directed to methods of pre-sterilizing the necessary instruments of a blow-fill seal apparatus, such that low acid foods may be aseptically packaged in accordance with FDA standards. The disclosure is also directed to methods of maintaining the sterility of the aseptic work zone during multiple blow-fill seal cycles. Additionally, provided herein are methods for continuously forming an aseptic work zone for a blow-fill seal operation. In some embodiments, the method includes continuously forming multiple aseptic work zones throughout the blow-fill seal operation.

In some embodiments, the methods disclosed herein comprise forming and maintaining an aseptic work zone of a blow fill seal process, wherein the fill nozzle assembly is pre-sterilized and sterility maintenance of the fill nozzle assembly is accomplished via HEPA-filtered air. In some embodiments, all areas where filling operations occur are pre-sterilized, such as the shroud. Additionally, in some embodiments, the shroud area of the blow-fill seal machine is pre-sterilized with a suitable sterilizing gas and is maintained sterile by HEPA-filtered air. Accordingly, as the fill nozzle assembly moves into filling position and then back into resting position once the container is filled, the fill nozzle assembly and shroud both remain sterile.

Generally the methods disclosed herein include creating an aseptic work zone subjecting the critical, direct, and indirect food product contact surfaces of the blow-fill parison, fill nozzle assembly, and resulting hermetically sealed container to a sterilant prior to the start of blow-fill-seal operations. Further, the aseptic work zone is maintained sterile by providing continuous sterile gas to all critical, direct and indirect food product contact surfaces of the parison, fill nozzle assembly, the shroud that houses the fill nozzle assembly, and the resulting hermetically sealed container. In some embodiments, the sterile gas may be selected from at least one of the following: sterile-filtered air, sterile HEPA-filtered air, and combinations thereof. Further, in some embodiments, the aseptic work zone is maintained through the uni-directional flow of sterile gas and/or sterile air out of the aseptic work zone.

In some embodiments, given that the aseptic work zone and shroud are pre-sterilized and maintain sterility throughout the blow-fill seal process, the blow-fill seal machinery does not need to be enclosed in a separate sterile environment, container, or enclosure.

In some embodiments, the method includes the step of subjecting the surface of a fill nozzle assembly, blow-fill parison and resulting hermetically sealed container with a sterile gas, such that the sterile gas continuously passes across the critical, direct, and indirect food product contact surfaces thus maintaining a sterile aseptic work zone. Moreover, in some embodiments the sterile gas continuously passes across the critical, direct, and indirect food product contact surface such that the blow fill seal process does not need to take place in a completely enclosed and sterilized environment.

Once the system/equipment is pre-sterilized, in some embodiments the sterility is maintained in the shroud area, which is where filling of the container occurs, via sterile-filtered HEPA air. In some embodiments, the fill nozzle assembly descends from the shroud into the container for filling. Once filling is completed, the fill nozzle assembly ascends back into the shroud.

Briefly, in some embodiments, the aseptic work zone, which includes the extruded plastic parison, is pre-sterilized and remains sterile due to the extrusion temperature. In some embodiments, the interior surface of the plastic parison is maintained sterile, at least initially, with sterile-filtered ballooning air. Once the bottom mold closes and the parison is cut from the extruder, sterility of the product contact surfaces, including the interior of the plastic parison and the open end surface of the plastic parison, are maintained by the uni-directional flow of the sterile ballooning air that flows upwards and out of the opening of the parison. This uni-directional flow of sterile ballooning air continues as the mold carriage moves the plastic parison to a filling position under the shroud/fill nozzle assembly.

Sterility is further maintained, in some embodiments, by having the sterile fill nozzle assembly descends into the open parison and resulting container where sterile blowing gas and sterile product are filled into the container. Here again, sterile gas flows uni-directionally upwards and out over the open end of the container while the product is being filled. The seal mold closes resulting in a sterile, hermetically sealed container. The fill nozzle assembly ascends and is maintained sterile via sterile-filtered HEPA air. While this is occurring, the next parison is being formed by the extruder, hence the "continuous" nature of forming the aseptic work zone.

In some embodiments, the aseptic work zone of the present methods is mobile and is not stationary. For example, the plastic parison is formed by the extruder and is then cut and removed from the extruder and positioned under the shroud, which houses the fill nozzle assembly. Thus, the aseptic work zone, which includes the plastic parison, is secured in the mold carriage and moved from under the extruder to a filling position under the shroud and fill nozzle assembly. During the movement of the plastic parison from under the extruder to filling position under the shroud, there is a uni-directional flow of sterile gas upwards and out of the parison and across the open end of the parison, which maintains the sterility of the plastic parison during transit.

In some embodiments, the sterilizing gas may be selected from the at least one of the following: vapor hydrogen peroxide, chlorine dioxide, nitrogen dioxide and combinations thereof. In some embodiments, the sterile gas may be selected from at least one of the following: sterile-filtered air, HEPA-filtered air, nitrogen, oxygen, argon, carbon dioxide, and combinations thereof. In some embodiments, pre-sterilization of the fill nozzle assembly and direct product contact piping is accomplished via saturated steam FDA regulations require that before the start of aseptic packaging operations, both the container and the closure sterilizing system and the product filing and closing system shall be brought to a condition of commercial sterility. The methods of the present disclosure are designed to be compliant with the FDA regulations for thermally processing low acid foods in hermetically sealed containers. Thus in some embodiments, the method(s) includes the step of sterilizing the critical, direct, and indirect food product contact surfaces of the blow fill seal operation to a condition of commercial sterility in accordance with FDA regulations.

Further, in some embodiments, the method includes the step of pre-sterilizing the fill nozzle assembly. In some embodiments the pre-sterilization of the fill nozzle assembly comprises subjecting the fill nozzle assembly of a blow-fill seal apparatus with a sterilizing gas. In some embodiments, the fill nozzle assembly is pre-sterilized with saturated steam.

FIG. 1 depicts the fill nozzle assembly 10 suitable for use during aseptic blow-fill seal packaging of low acid foods. The fill nozzle assembly 10 includes the fill nozzle sleeve 20 and fill tube 30. In some embodiments, these components of the fill nozzle assemble are pre-sterilized along all critical, direct and indirect food product contact surfaces with saturated steam. Once the fill nozzle assembly 10 is pre-sterilized, the blow-fill seal cycle may begin.

Figure 2:
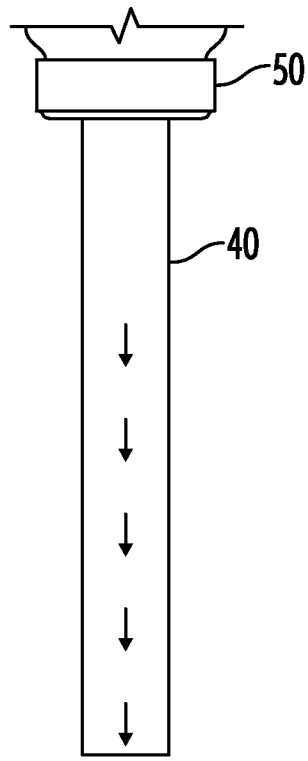
FIG. 2 illustrates an extruder and parison.

Referring to FIG. 2, the blow-fill seal process begins when melted plastic is pressed and extruded through an extruder 50 to form a parison 40. In some embodiments, the parison 40 is continuously being formed by the extruder 50 throughout the blow-fill seal process. The plastic selected to form the parison 40 may be any known in the art suitable for packaging infusions, injections, enemas, eye, ear or nose drops, and nutritional compositions, including but not limited to: infant formulas, pre-term infant formulas, children's nutritional products, and enteral nutritional formulas. In some embodiments, the parison 40 may be comprised of polyolefins, which includes but is not limited to polyethylene of various densities and polypropylene. Further, the parison 40 may comprise polyvinyl chloride ("PVC") granulate. The plastic or plastics used to form the parison 40 may be registered with the FDA, especially if the packaged product is to be supplied to a clinical pharmacy.

The extrusion temperature of the parison 40 is such that the plastic is sterilized. Since the entire blow-fill seal process takes a few seconds, the plastic parison does not lose enough heat to compromise sterility, and therefore the extruded plastic maintains sterility throughout the fill cycle. Sterile ballooning air is also used to maintain the sterility of the parison. The extrusion temperature of the plastic parison 40 may vary, for example, in some embodiments the extrusion temperature is from about 150° C. to about 230° C. In some embodiments, the extrusion temperature of the plastic parison 40 is 160° C. to about 200° C. Due to extrusion at these temperatures a sterile parison 40 is formed.

Thus, in some embodiments, the method(s) herein may comprise the step of extruding hot molten plastic via an extruder. Further, the method(s) disclosed herein may include the step of extruding hot molten plastic via an extruder, wherein the extrusion temperature is such that a sterile parison 40 is formed.

As the plastic is being extruded from the extruder 50, the interior of the parison 40 is maintained sterile by sterile ballooning gas and/or sterile gas. Further, the shape of the parison 40 is formed by the extruder 50. The parison 40, which is continuously extruded, is open at the lower end therefore, theoretically, microorganisms from the ambient air could intrude into this lower open end of the parison 40 creating unfavorable conditions and compromising the sterility of the parison 40. However, contamination of the lower open end of the parison 40 is prevented by continually flowing sterile ballooning gas through the parison 40. This method of continuously blowing ballooning air through the parison 40 during formation is especially useful for a parison 40 having a narrow diameter.

In some embodiments, the method(s) includes the step of passing sterile ballooning gas through the plastic parison such that microorganisms and/or other contaminants are kept from entering the open end of the plastic parison. In some embodiments, the methods disclosed herein include the step of passing sterile ballooning gas through the plastic parison such that the interior and lower open end of the plastic parison is maintained in a sterile condition in accordance with FDA regulations.

The ballooning gas used to form the parison 40 may be any sterile gas known in the art. Prior to introduction into the interior of the plastic parison 40, the ballooning gas is maintained so as not to introduce any infection into the plastic parison as it is being formed. The ballooning gas may be sterilized by any suitable method known in the art prior to being introduced into the aseptic work zone. In certain embodiments, prior to entering the aseptic work zone the ballooning gas may be introduced to a liquid separator to eliminate high humidity, potential traces of oil, and any other contaminants.

In other embodiments, the ballooning gas may be pre-filtered for removing suspended particles of contaminants. In some embodiments, the filter size may be selected such that contaminant particles of a certain size are filtered from the sterilized ballooning gas. For example, a filter may be selected such that all particles having a diameter of up to 1 μm are removed. In still other embodiments, the ballooning gas may be pre-sterilized by being passed through an activated charcoal absorber for absorbing any odiferous particles and/or particles that would compromise the overall taste of the finally packaged food product. Yet in other embodiments, the ballooning gas may be pre-sterilized by being passed through a sterile filter such that particles, microbes and spores down to a particle size of 0.2 μm are filtered out of the ballooning gas.

Further, the lines through which the ballooning gas is passed are sterilized in their installed state prior to being used in food packaging. The lines may be sterilized by any procedure known in the art. For example, in some embodiments the lines may be sterilized with pre-cleaned pressurized steam of at least 2.5 bar and at a temperature of at least 120° C. for at least 25 minutes. The steam condensate is then blown out of the line with sterile air and the lines are then cooled. In this embodiment, reinfections in the lines which carry the ballooning gas downline from the air processing section are prevented. In some embodiments, the lines carrying the sterile ballooning gas may also be pre-sterilized with a sterilizing gas. The sterilizing gas may include, but is not limited to, vapor hydrogen peroxide, chlorine dioxide, nitrogen dioxide, and/or mixtures thereof.

Figure 3:
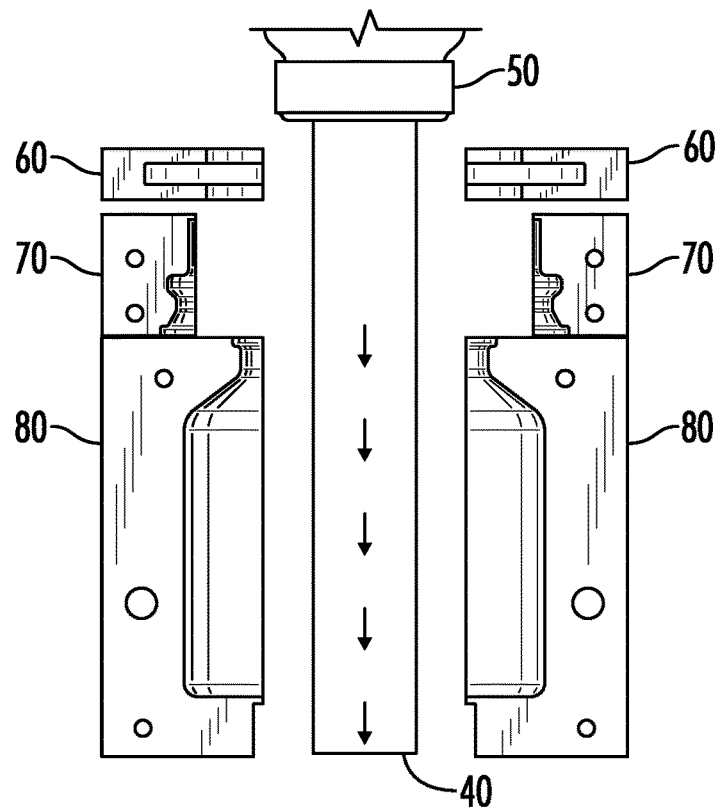
FIG. 3 displays the extruder and parison just prior to being secured by the blow mold apparatus. Also shown are the clamping jaw, seal mold, mold walls, and bottom mold of the blow mold apparatus.

After the parison 40 is extruded it must be separated from the extruder 50 at the upper end. FIG. 3 shows the blow mold 90 in open position just before it closes around the parison. The permanent flow of sterile ballooning gas in the interior of the parison 40 ensures that, before the parison 40 is cut the plastic of the parison 40 is in firm contact with the clamping jaws 60 of the blow mold 90, also as shown by FIG. 3.

Figure 4:
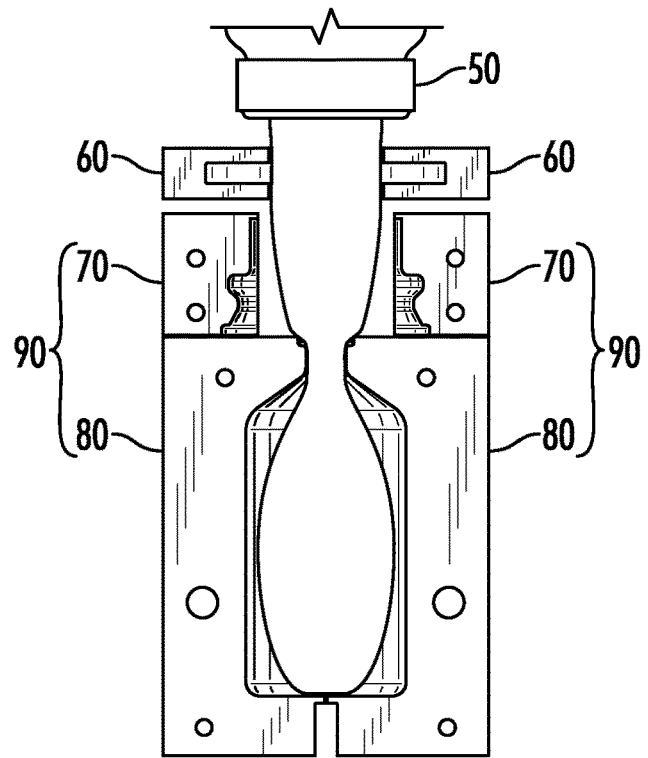
FIG. 4 displays the blow mold in closed position around the blown parison. The clamping jaws are secure around the parison and the seal mold is in open position.

Referring now to FIG. 4, the bottom mold 80 closes around the parison 40 effectively creating a closed bottom end of the parison 40. The upper end of the parison 40 is then held by the clamping jaws 60 and the parison 40 is cut from the extruder 50 by any suitable sterile cutting device. The parison 40 is cut below the extruder 50 and above the blow mold 90 to create an opening which allows the fill nozzle assembly 10 to be moved downwardly into the opening of the parison 40 for molding and thereafter filling the molded container 110. Cutting devices suitable for the present disclosure include, but are not limited to, sterile wires or sterile knives. In embodiments where a sterile knife is used, the sterile knife may be heated to about 275° C. to about 450° C. or any suitable temperature to ensure the sterility of the knife.

The blow mold 90 must leave the position under the extruder 50, because the next section of parison 40, through which sterile ballooning gas is flowing, emerges continuously. The blow mold 90 then moves to the filling station. The hot plastic parison 40 in the blow mold 90, which was formed by cold, sterile air begins to shrink in the blow mold 90 as the pressure drops. The sterile air displaces any atmospheric air located around the open upper end of the parison 40. As the volume of the parison 40 in the blow mold 90 decreases, at the same time the cold sterile air begins to warm up inside the plastic parison 40. The warmed sterile air increases in volume creating an excess pressure, which makes it impossible for non-sterilized ambient air to enter the parison 40; accordingly the sterility of the open ended plastic parison 40 is maintained.

Thus in some embodiments, the method(s) disclosed herein further comprise the step of cooling the hot plastic parison such that the sterile gas located in the interior of the plastic parison passes out of the open end of the plastic parison thereby maintaining the sterility of the open end of the plastic parison. This uni-directional flow of sterile gas out of the interior of the plastic parison and out the open end of the plastic parison ensures that the plastic parison and the open end of the parison remain sterile.

Further, in some embodiments, the method(s) disclosed herein include the step of the uni-directional passing cold sterile air from the interior of the parison out the upper end of the parison. In still other embodiments, the method may comprise the step of decreasing the volume of the parison in the blow mold such that sterile air located in the parison is allowed to pass out of the open end of the parison thus ensuring that contaminants, such as microbes and/or other microorganisms are not able to enter the open end of the parison.

Figure 5:
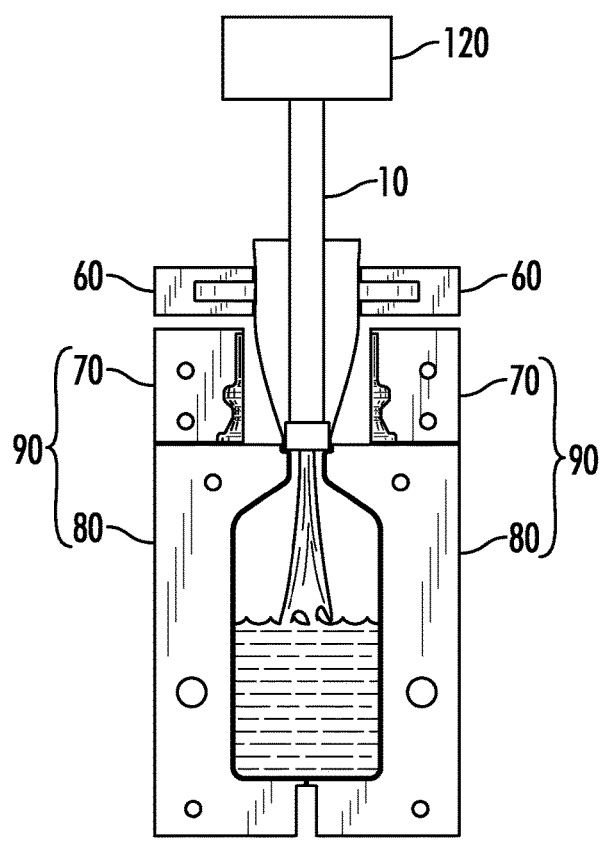
FIG. 5 illustrates the shroud that houses the fill nozzle assembly during the fill cycle.

Once under the filling station, the fill nozzle assembly 10 descends from the sterile shroud 120. See FIG. 5. Briefly, the shroud 120 is pre-sterilized via any suitable gaseous sterilant know in the art. Once the shroud 120 is pre-sterilized, the continuous uni-directional flow of HEPA filtered air will maintain the sterility of the shroud 120, fill nozzle assembly 10 and aseptic work zone. As the fill nozzle assembly 10 moves vertically in and out of the sterile shroud 120 into filling position above parison 40 and the resulting container 110, there is the opportunity for pathogens and microbes to infect the surfaces of fill nozzle assembly 10 that come into contact with the parison 40 and the resulting container 110, thereby compromising the sterility of the aseptic work zone. However, the sterile shroud 120 is pressurized with sterile HEPA-filtered air that continually purges the surfaces of the fill nozzle assembly 10 thus maintains the sterility of the outer surfaces of the fill nozzle assembly 10 and thus of the aseptic work zone between each fill cycle.

In some embodiments, sterility maintenance of the outside surfaces of the fill nozzle assembly 10 is accomplished with sterile HEPA-filtered air. The sterile air selected for maintaining the sterility of the shroud 120 may be any known in the art. In some embodiments the sterile air included in the shroud 120 is sterile HEPA-filtered air. In some embodiments, the sterile air may include, but is not limited to, nitrogen, carbon dioxide, oxygen, argon, and mixtures thereof.

Figure 6:
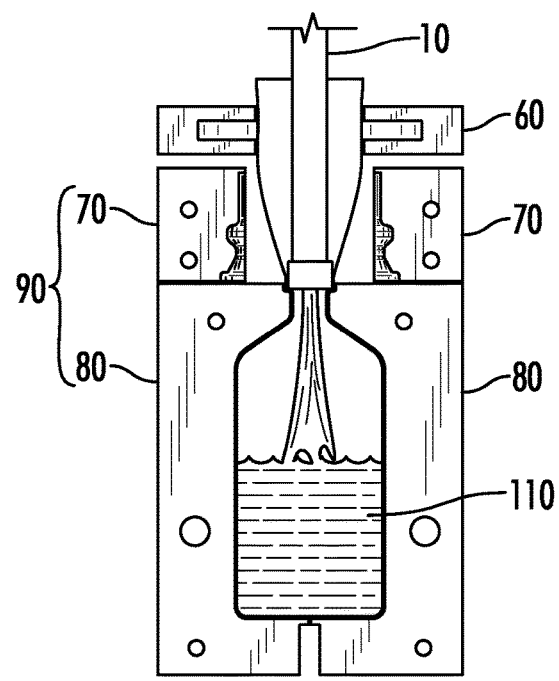
FIG. 6 shows the fill nozzle assembly contacting the upper end of the parison, and filling the blown container with food product.

Once the fill nozzle assembly 10 has made contact with the open end of the parison 40, the fill nozzle assembly 10 then administers sterile blowing gas through the fill nozzle sleeve 20 into the parison 40, forcing the parison 40 against the mold walls 100 and thereby forming a plastic container 110 from the parison 40. See. FIG. 6. Thus, in some embodiments the method includes the step of subjecting the plastic parison to sterile blowing gas thereby forming a plastic container within the mold.

The blowing gas used to form the container 110 may be any sterile gas known in the art. Prior to introduction into the interior of the container 110, the blowing gas is maintained so as not to introduce any infection into the plastic parison 40 or container 110 as it is being formed. The blowing gas may be sterilized by any suitable method known in the art prior to being introduced into the aseptic work zone. In certain embodiments, prior to entering the aseptic work zone the blowing gas may be introduced to a liquid separator to eliminate high humidity, potential traces of oil, and any other contaminants.

In other embodiments, the blowing may be pre-filtered for removing suspended particles of contaminants. In some embodiments, the filter size may be selected such that contaminant particles of a certain size are filtered from the sterilized blowing gas. For example, a filter may be selected such that all particles having a diameter of up to 1 µm are removed. In still other embodiments, the blowing gas may be pre-sterilized by being passed through an activated charcoal absorber for absorbing any odiferous particles and/or particles that would compromise the overall taste of the finally packaged food product. Yet in other embodiments, the blowing gas may be pre-sterilized by being passed through a sterile filter such that particles, microbes and spores down to a particle size of 0.2 µm are filtered out of the blowing gas.

Further, the lines through which the blowing gas is passed are sterilized in their installed state prior to being used in food packaging. The lines may be pre-sterilized by any procedure known in the art. For example, in some embodiments the lines may be sterilized with pre-cleaned pressurized steam of at least 2.5 bar and at a temperature of at least 120° C. for at least 25 minutes. The steam condensate is then blown out of the line with sterile air and the lines are then cooled. In this embodiment, reinfections in the lines which carry the blowing gas downline from the air processing section are prevented. In some embodiments, the lines carrying the sterile blowing gas may also be pre-sterilized with a sterilizing gas. The sterilizing gas may include, but is not limited to, vapor hydrogen peroxide, chlorine dioxide, nitrogen dioxide, and/or mixtures thereof.

Before the container 110 can be filled with the desired low acid food product, the blowing gas used to mold the container 110 must first be discharged from the container 110. However, the sterilized blowing gas in the container 110 cannot simply be released through an exhaust as this may introduce microbes and spores in the sterile system along the exhaust path. Rather, the immersed blowing gas is removed from the container 110 via the fill nozzle sleeve 20 which surrounds the fill tube 30 of the fill nozzle apparatus 10 as the sterile product is being filled into the container 110. In this manner the fill nozzle sleeve 20, fill nozzle assembly 10, and newly-formed container 110 maintain sterility.

In some embodiments, the method further includes the step of removing the sterile blowing gas from the plastic container via the fill nozzle sleeve located in the fill nozzle assembly. In some embodiments, the fill nozzle sleeve is pre-sterilized by any method known in the art. Further, in some embodiments, the fill nozzle sleeve is continually subjected to sterile air, including HEPA filtered air, such that the fill nozzle sleeve maintains sterility throughout the blow fill seal process. In some embodiments, the sterile air may include, but is not limited to, nitrogen, oxygen, carbon dioxide, argon, and mixtures thereof.

The fill tube 30 of the fill nozzle assembly 10 deposits the desired low acid food product into the container 110. The low acid food product is first sterilized to eliminate bacteria and pathogens. In some embodiments, the low acid food product is sterilized in a manner to meet the commercial sterility requirements of thermally processed food as required by FDA regulations. Thus, in some embodiments, the low acid food product is sterilized by any sterilization method including, but not limited to, filter sterilization, ultra-high temperature "UHT" sterilization, and combinations thereof.

In some embodiments, prior to filling the container 110, the low acid food product is sterilized by filtration. For example, in embodiments where the low acid food product may include protein solutions, the low acid food product may be sterilized via an appropriate filter sterilization procedure.

In some embodiments, prior to filling the container 110, the low acid food product is sterilized by an ultra-high temperature "UHT" pasteurization process. The time and temperature of the UHT process are those required to meet the FDA standard, which depend on the composition of the low acid food product. After, UHT pasteurization the low acid food product is delivered to the fill tube 30 inside the fill nozzle assembly 10. The low acid food product is then discharged from the fill tube 30 into the container 110. After the container has been filled with the low acid food product, in some embodiments, the fill nozzle assembly 10 ascends back into the shroud 120.

Figure 7:
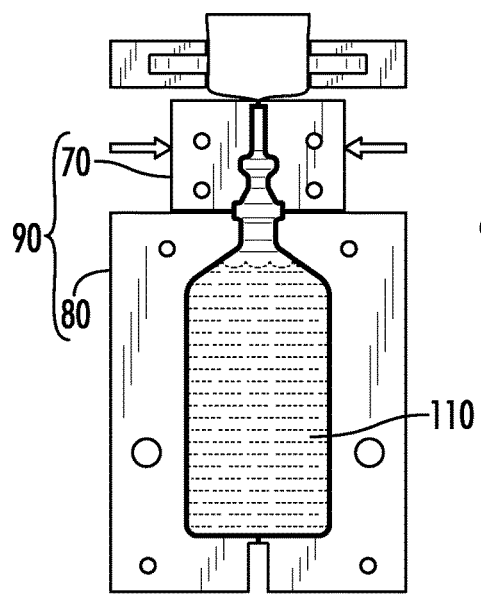
FIG. 7 shows the seal mold of the blow mold in closed position, thus hermetically sealing the container.

After the container 110 is filled with the desired low acid food product the container 110 is then closed thus creating a hermetically sealed container. The closing of the container 110 may be instituted when the fill nozzle assembly 10 vertically retracts from fill position back to resting position inside the shroud 120. The seal mold 70 then closes above the molded body of the container 110, and as a result of the pressure exerted by the seal mold 70, the upper section of the container 110 is molded shut. See FIG. 7.

Figure 8:
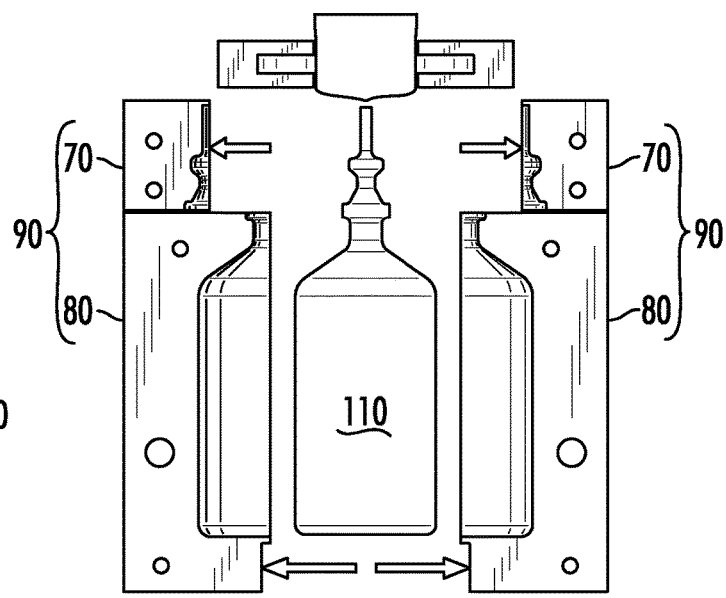
FIG. 8 illustrates the retraction of the blow mold from the hermetically sealed container filled with food product.

Further, the volume of air in the upper section of the container 110 is reduced when the seal mold 70 closes. Accordingly, sterile air above the low acid food product in the container 110 is forced outward. This volume reduction leads to an outflowing of sterile air above the upper end of the container 110, which lasts until the container 110 is welded shut. The container 110, now filled with low acid food product, is then released from the blow mold 90 and the fill cycle repeats itself. See FIG. 8.

Accordingly, in some embodiments, the method includes the step of displacing sterile air in the plastic container with a low acid food product such that the sterile air is force out of the opening of the container. The sterile air that passes out of the container then passes over the opening of the plastic container, further ensuring that the container maintains sterility. The method may further include the step of molding or welding the open end of the container shut thereby producing a hermetically sealed container.

Maintaining sterility of the aseptic work zone during different steps of the fill cycle may depend on the overall cycle time for the blow-fill seal operation. For example, in some embodiments the total fill cycle time from extrusion of the parison to removal of the container filled with low acid food product may be from about 8 seconds to about 15 seconds per container. In some embodiments, the fill cycle time is from about 9.5 seconds to about 11.5 seconds per container.

In some embodiments, both the pre-sterilization methods and methods for maintaining the sterility of the aseptic work zone meet the commercial sterility of equipment and containers requirements set by the FDA.

Additionally, in some embodiments, the disclosure provides a method of producing a hermetically sealed container containing a low acid food product. The method of producing the hermetically sealed container may include at least one of or any combination of the following steps:

i) extruding hot molten plastic via an extruder at an extrusion temperature sufficient to maintain sterility of the plastic;

ii) passing sterile gas through the hot molten plastic to maintain a sterile plastic parison;

iii) subjecting the sterile plastic parison to a mold apparatus to seal the bottom of the parison;

iv) cutting the hot plastic parison with a sterilized cutting device such that the parison is removed from extruder and a plastic parison having a closed end and an open end is formed;

v) cooling the hot plastic parison such that the sterile gas located in the interior of the plastic parison passes out of the open end of the plastic parison thereby maintaining the sterility of the open end of the plastic parison;

vi) subjecting the open upper end of the plastic parison to the sterile fill nozzle assembly;

vii) providing a sterile blowing gas from the fill nozzle assembly into the interior of the plastic parison thereby forming a plastic container having a sterile interior and an open end;

viii) passing sterile blowing gas from the sterile interior of the plastic container outward and across the open end of the container to maintain sterility of the open end of the container;

ix) filling the container with a sterilized low acid food product; and x) hermetically sealing the open end of the container.

In some embodiments the method of producing the hermetically sealed container is not produced in a separate, enclosed and sterilized environment. In some embodiments, the hermetically sealed container is produced via a blow fill seal process, wherein the blow fill seal machinery is not enclosed in a sterilized environment.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. For example, while methods for forming and maintaining the pre-sterilization of an aseptic work zone of a blow-fill seal operation for the packaging of low acid foods have been exemplified, other uses are contemplated. Therefore, the spirit and scope of the appended claims should not be limited to the description of the preferred versions contained therein.

What is claimed is:

1. A method for forming and maintaining an aseptic work zone of a blow fill seal process, comprising:
    subjecting critical, direct and indirect food product contact surfaces of a fill nozzle assembly, parison and resulting hermetically sealed container to a sterile gas, wherein the sterile gas flows uni-directionally, thereby maintaining sterility of the critical, direct, and indirect food product contact surfaces during a fill cycle;
    extruding hot molten plastic via an extruder;
    continuously passing sterile gas through the hot molten plastic thereby creating a hot plastic parison;
    providing a mold apparatus comprising walls to enclose the hot plastic parison thereby sealing the bottom of the plastic parison;
    cutting the hot plastic parison with a sterilized cutting device such that is it removed from the extruder and forms a plastic parison having a closed end and an open end;
    subjecting the open end of the plastic parison to a sterile fill nozzle assembly; and
    providing a sterile blowing gas from the fill nozzle assembly into the interior of the plastic parison, wherein the sterile blowing gas forces the parison against the mold walls thereby forming a plastic container, wherein the sterile blowing gas passes out of the plastic container and maintains sterility of the opening of the plastic container,
    wherein the hot molten plastic is extruded at an extrusion temperature sufficient to maintain the sterility of the plastic.

2. The method of claim 1, wherein the aseptic work zone, comprising the critical and direct food product surfaces of the fill nozzle assembly, parison and resulting hermetically sealed container, is continuously being formed throughout the blow fill seal process.

3. The method of claim 1, wherein the extrusion temperature is from about 150° C. to about 230° C.

4. The method of claim 1, further comprising the steps of: moving the plastic parison from under the extruder to a filling position under the fill nozzle assembly, wherein the open end of the parison is subjected to the sterilized fill nozzle assembly.

5. The method of claim 4, wherein the fill nozzle assembly is sterilized with a sterilizing gas prior to the start of the fill cycle.

6. The method of claim 1, wherein the sterility of the fill nozzle assembly is maintained during and between each fill cycle by only making contact with the sterile plastic parison and resulting plastic container during filling operations, and further wherein the sterilized fill nozzle assembly is contained in a pre-sterilized shroud when not in filling position during the fill cycle.

7. The method of claim 6, wherein the shroud is pre-sterilized with a sterilizing gas selected from the group consisting of vapor hydrogen peroxide, chlorine dioxide, and nitrogen dioxide.

8. The method of claim 1, further comprising the step of:
    filling the container with a sterilized low acid food product; and
    hermetically sealing the open end of the container.

9. The method of claim 1, wherein the uni-directional flow of sterile gas maintains the sterility of all critical, direct, and indirect food product contact surfaces during a fill cycle, and further wherein the aseptic work zone, comprising the critical, direct and indirect food product surfaces of the fill nozzle assembly, parison and resulting hermetically sealed container, is continuously being formed throughout the blow fill seal process.

10. The method according to claim 1, wherein the sterile blowing gas passes out of the plastic container through the fill nozzle assembly.

* * * * *